United States Patent
Kalra (10) Patent No.: US 7,383,540 B2
(45) Date of Patent: Jun. 3, 2008

(54) ALTERING EXECUTION FLOW OF A COMPUTER PROGRAM

(75) Inventor: Mohit Kalra, Delhi (IN)

(73) Assignee: International Business Machines Corporation, Armonk, NY (US)

( * ) Notice: Subject to any disclaimer, the term of this patent is extended or adjusted under 35 U.S.C. 154(b) by 808 days.

(21) Appl. No.: 10/735,086

(22) Filed: Dec. 12, 2003

(65) Prior Publication Data

US 2005/0132338 A1   Jun. 16, 2005

(51) Int. Cl.
  *G06F 11/00* (2006.01)
  *G06F 9/44* (2006.01)
(52) U.S. Cl. .................. 717/129; 717/124; 717/126; 714/34; 714/35
(58) Field of Classification Search ........ 717/124–131, 717/154–158, 105, 109; 714/34–57; 712/233, 712/234, 244
See application file for complete search history.

(56) References Cited

U.S. PATENT DOCUMENTS

| | | | |
|---|---|---|---|
| 5,533,192 A * | 7/1996 | Hawley et al. ............... 714/28 |
| 5,687,375 A * | 11/1997 | Schwiegelshohn .......... 717/129 |
| 6,477,666 B1 * | 11/2002 | Sanchez et al. ............... 714/41 |
| 6,708,326 B1 * | 3/2004 | Bhattacarya ................. 717/124 |
| 6,848,097 B1 * | 1/2005 | Alverson et al. ............ 717/124 |
| 6,957,421 B2 * | 10/2005 | Hundt et al. ................. 717/130 |
| 6,981,243 B1 * | 12/2005 | Browning et al. ........... 717/124 |
| 2003/0149961 A1 * | 8/2003 | Kawai et al. ................ 717/129 |
| 2004/0205720 A1 * | 10/2004 | Hundt ......................... 717/124 |
| 2004/0268315 A1 * | 12/2004 | Gouriou et al. ............. 717/129 |
| 2005/0071819 A1 * | 3/2005 | Calyanakoti et al. ........ 717/128 |

OTHER PUBLICATIONS

Stallman et al., "Debugging with GDB," Free Software Foundation, Feb. 1999.*

* cited by examiner

*Primary Examiner*—Meng-Al T. An
*Assistant Examiner*—Insun Kang
(74) *Attorney, Agent, or Firm*—Anthony V S England; William Steinberg (57) ABSTRACT

A debugger alters the execution flow of a child computer program of the debugger at runtime by inserting jump statements determined by the insertion of breakpoint instructions. Breakpoints are used to force the child computer program to throw exceptions at specified locations. One or more instructions of the computer program are replaced by jump instructions. The jump destination addresses associated with the break instructions can be specified by input from a user. The debugger changes the instruction pointer of the child program to achieve the desired change in execution flow. No instructions are lost in the child program.

7 Claims, 5 Drawing Sheets

ALTERING EXECUTION FLOW OF A COMPUTER PROGRAM

FIELD OF THE INVENTION

The present invention relates to altering the execution flow of computer programs.

BACKGROUND

Computer programs have an execution flow governed by their compiled statements. Altering the execution flow of programs from its usual course is required in many instances for testing or experimentation purposes, or simply to assist an understanding of how the computer program operates. Currently there are two particular techniques that can be used to alter the flow of execution of a computer program.

A first technique involves changing the code, and recompiling the program, so that the required change in execution flow is achieved. A disadvantage of this first code-changing techniques is that recompilation is necessary. If the programmer wants to alter the execution for one run only, then the change must be made and the program recompiled. After testing, the change needs to be reverted and the program recompiled yet again. Importantly, recompilation may not even be a feasible option if the build takes too long. This is true for products with a significant code base.

A second technique involves changing an instruction pointer while the program is running. A programmer can change the instruction pointer using a debugger to suspend execution of the program at a particular point, and manually set the next statement. Most debuggers have a "Set Next Statement" or similar option providing an equivalent function. This changes the flow by changing the current point of execution. The debugger controls the child program and can alter the child's register contents. The above is achieved by altering the instruction pointer of the child program.

The second technique involving the instruction pointer also has disadvantages. Perhaps most critically, this second technique relies on manual intervention on the part of the programmer each time the program's flow is to be altered. Thus, the technique can often be impractical if the location at which the flow needs to be changed is called very frequently. As an example, consider a code location that is called 1000 times, which is not unlikely for a computer program. To achieve the effect of the altered flow, the programmer needs to perform the manual steps 1000 times. This phenomenon arises regardless of whether the flow needs to be altered in a loop, or in a method that is called very frequently. Needless to say, this approach soon becomes impractical in such situations.

Consequently, a need clearly exists for an improved manner of altering the execution flow of computer programs.

SUMMARY

A technique is described herein for altering a program's execution flow at runtime, implemented in a computer program debugger of the kind used by programmers. A debugger is a computer program that executes the program being debugged as its child program. The debugger has the capability of altering the child program's memory and the child program's registers. This capability extends to the child program's code. Special instructions can be inserted in the child program, so that the child program throws exceptions when these instructions are executed. The same effect can be achieved through hardware.

This concept of forcing the child program to throw exceptions at locations convenient to the debugger involves the use of breakpoints. This technique is used to notify the debugger when a location in code is reached.

The techniques described herein provide a programmer with the facility of inputting the desired flow of execution for the program being debugged which, to the debugger, is its child program. The debugger detects the location where the flow is to be altered. The debugger changes the instruction pointer of the child program to achieve the desired change in execution flow. No instructions need be lost in the child program.

In summary, the debugger alters the child program by inserting jump statements. The jump destination addresses are specified by a user. One or more instructions are replaced by a jump instruction. Therefore, this technique is used when the debugger determines that loss of a current instruction does not pose a problem.

DETAILED DESCRIPTION

The operation of debuggers is first described by way of background, to assist an understanding of the described implementation of the debugger technique described herein. Following this description, three specific examples, and particular implementational details are described.

Debugger Operation

Debugging is the process of observing a program's flow, and its status, and assisting in fixing any problems associated with operation of the program. A tool to achieve this is commonly known as a "debugger". The program being debugged is known as the debugee program, or the child program.

A state of a program at any time relates to the state of variables, memory addresses, and particular registers at that moment. Debugging involves observing the state of the child program at points convenient to the programmer. Such observations are usually made by stopping program execution to observe the state of the child program. This technique is known as breakpoint debugging. Breakpoint debugging involves the use of a breakpoint facility provided by the debugger to stop the execution of the child program. Breakpoints are usually associated with lines of code, and program execution temporarily stops when the relevant line of code is reached.

A debugger runs the program being debugged as its child. This relationship between the two programs is necessary for the debugger to gain full control over the child program. This means that the debugger gains full control over the child program's state, its execution code, and the signals and notifications the program may receive. In modern operating systems, every program executes in its own address space. In this context, full control implies the ability of the debugger to gain full control in the child's address space.

The operating system facilitates this control by providing special system calls. The operating system not only allows the debugger to alter the child's memory and register contents, but also to intercept signals meant for the child program. Signals are special notifications sent to executing programs by the operating system to inform the executing program of an operating system event.

Programmers can gain full control over the child program via debuggers. The executing programs need to be temporarily suspended, however, for the debugger to change or query the state of the program. This can be achieved by inserting special instructions in the child program, namely breakpoints as described above.

The debugger, with its ability to stop the child program's execution and the ability to gain control over the child program, facilitates in debugging. This facility alone does not suffice for debugging, as programmers prefer to comprehend the state of the code in a high level language, rather than the binary code that actually executes in the machine. Therefore, during compilation, a special flag enables the generated code to store extra information known as the debugging information. This information maps the variable names with the memory address and the lines of code with the machine instructions.

After debugging, a compiler compiles the source code into object code. A linker creates the final executable binary code by linking object code produced by the compiler, typically with other object code. The special flag that enables debugging information to be generated embeds the debugging information in the object code, and this debugging information is finally embedded into the executable. During debugging, the programmer is able to relate the program execution in terms of the high level language. The debugger also allows the programmer to query and alter the memory using variable names as defined in the high-level language computer program.

In summary, debuggers gain full control over the child program. Operating systems facilitate in cases where the two programs have an independent process address space. The debugger can suspend child program's execution with the use of breakpoints. Breakpoints do not result in any loss of instructions when used. And, finally, for a productive debugging session, special debug information facilitates in mapping machine code to high level language code and mapping variable names to their memory addresses.

Breakpoints

Breakpoints can be broadly classified as software breakpoints, or hardware breakpoints, as described herein. Data breakpoints also exist, but are seldom used.

Software breakpoints are inserted by a debugger at locations at which the debugger wants the child program to suspend execution. Breakpoints are instructions that are provided in the instruction set of a processor that throws an exception. Before inserting the instruction, the debugger stores the original instruction for later use. The debugger waits for the child program to throw an exception because of the instruction, and then replaces the original instruction and single steps the program. The debugger then reinserts the breakpoint so that execution breaks the next time as well. The exception passes control to the debugger thread. The debugger then waits for input from the programmer for further processing.

Hardware breakpoints are provided by a hardware facility in the processor that throws an exception when the instruction pointer matches the line of the code where execution is to be suspended. Hardware breakpoints do not require altering the child program's instructions. Hardware breakpoints are therefore fast, but are limited in number. Some hardware architectures do not support hardware breakpoints.

Data breakpoints, similar to software breakpoints, are provided as a facility in the hardware processor to suspend program execution when a memory area is read from or written to. Data breakpoints provide the debugger with an ability to suspend execution when memory is altered, in absence of a hardware facility. Single stepping the complete code and examining the memory after each step usually helps achieve this. The processor provides the ability to single step. This technique can be slow and is generally seldom used.

Runtime Image of a Program

A linker generates an executable after processing the object code generated by the compiler. This executable is usually stored on a disk medium. When a program is executed, the program is read into the memory by a program called the loader. The program has to be loaded in order for the program to be executed by the processor. Changing an in-memory copy of the program does not change the original program. Any changes to the program are temporary and are effective until the program has not terminated. A fresh execution of the program reflects the disk image.

As explained earlier, software breakpoints are implemented by patching code. This patching is done on the in-memory copy of the program being debugged. The original program remains untouched. Alteration of computer memory achieves the effect of jump points. The image is constantly altered (or altered during start-up) as described below. Runtime alteration of the flow of a computer program involves changing program flow in the running in-memory copy of the program under the influence of a debugger.

Execution Flow Technique

A technique is described herein for altering execution flow of a computer program are described below. This technique involves changing execution flow by "jumping" from an origin address to a destination address. This is achieved in computing architectures by overwriting an instruction pointer to refer to the destination address, rather than simply the instruction address that follows that of the origin address. For convenience, execution of the computer program is described as jumping to a destination address. This usage, however, refers to the process of changing the instruction pointer to the destination address.

The process of changing the instruction pointer is automated. Recompilation is avoided. Automatically changing the instruction pointer is desirable as an alternative to manually altering the instruction pointer for code that is "hit" frequently. After taking input from a user, the debugger inserts special breakpoints called "jump points". The jump points can be stored in a normal breakpoint list, or as a separate list. The contents of the jump point are listed below.

(i) The location at which the jump is to be performed, namely the address of the relevant instruction.

(ii) The destination location, which is the intended address at which execution should resume.

(iii) The memory address that stores the instruction that is replaced while inserting a jump point.

Figure 1:
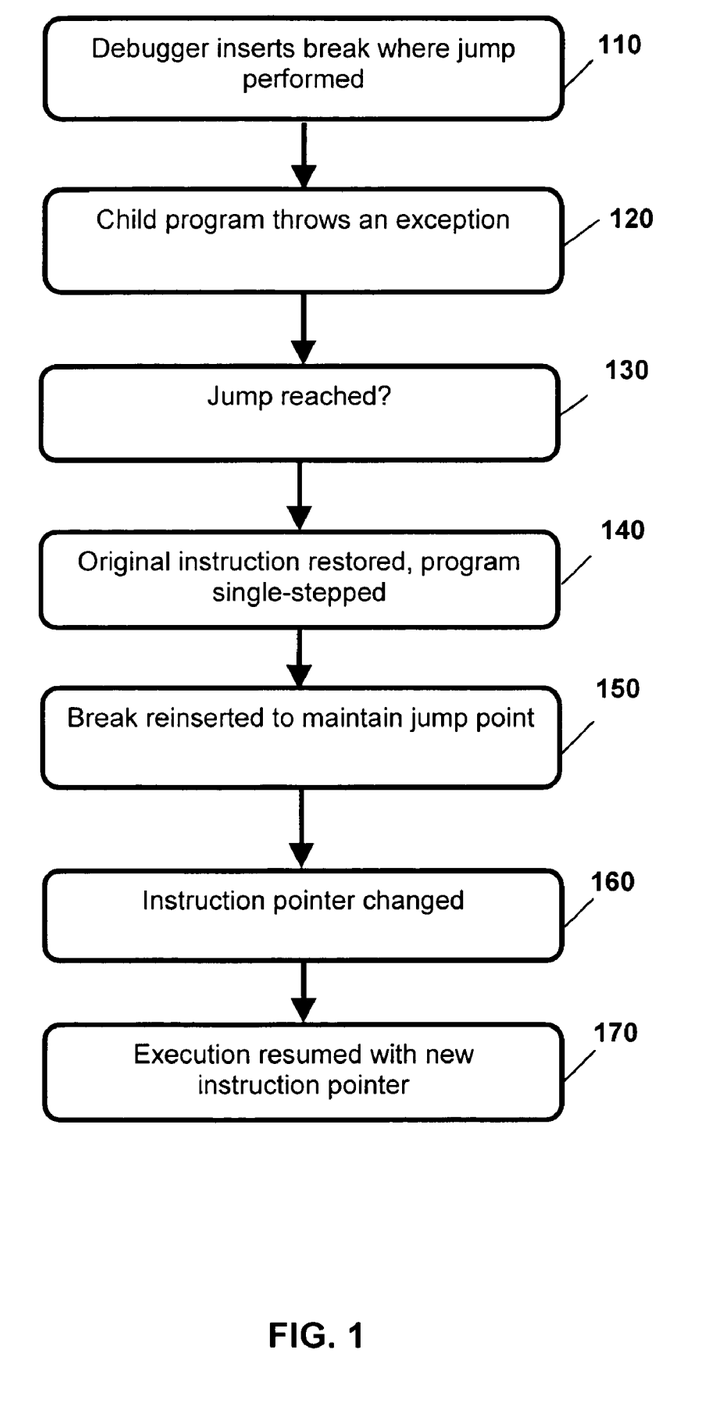
FIG. 1 is a flow chart of steps in a technique for altering flow execution in a computer program.

FIG. 1 is a flow chart of steps, which are outlined below, for altering flow execution in a computer program at runtime.

Step 110 When the debugger starts (or resumes) program execution, the debugger inserts a break instruction at locations where the jump is to be performed.

Step 120 When the break instruction is executed, the child program throws an exception. Control then passes to the debugger.

Step 130 The debugger then determines if a jump point is reached.

Step 140 If a jump point is reached, then the original instruction is restored in memory, and the program is "single stepped".

Step 150 The break instruction is again reinserted at the statement where the break instruction is detected, so that the jump point is not lost.

Step 160 The instruction pointer is then changed to the desired location, as specified by a user.

Step 170 The debugger then continues the execution of the child program automatically. The child now executes with the new instruction pointer set by the debugger.

Changes to an existing debugger are as follows. A user-interface for the debugger provides a user with an option to specify how the flow is to be altered. The debugger is modified to save the instruction at the point from where the jump is to be made. The debugger inserts exception-throwing instructions at locations from where the jump is to be made, and distinguishes these exceptions as jump point exceptions rather than that of normal breakpoints. Finally, the debugger alters the instruction point to the destination address specified by the user.

Described below are three examples, subtitled Case I, Case II and Case III. To assist an understanding of the described technique, assume that the build time for the hypothetical product is relatively long, and that each of the snippets of code used below in these three examples are called relatively frequently.

CASE EXAMPLE I

Figure 2:
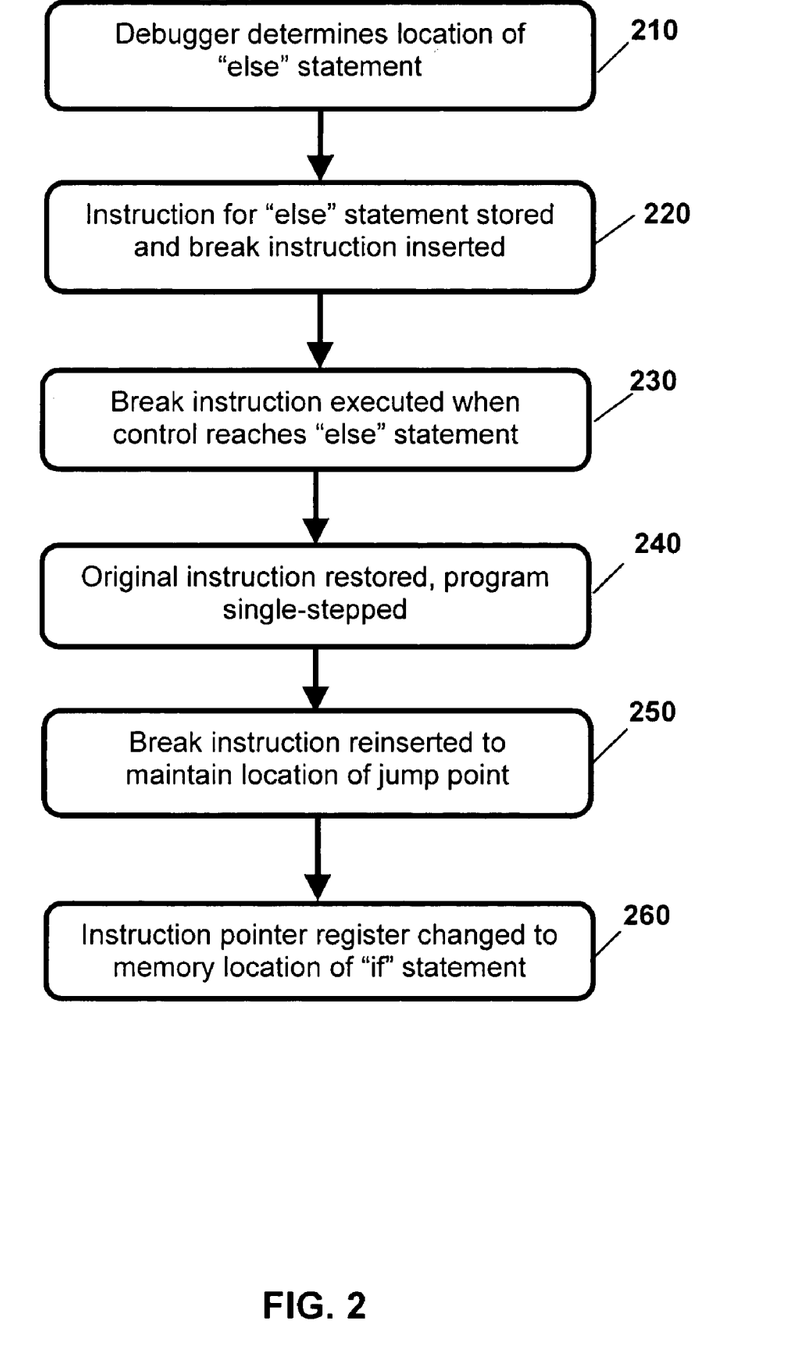
FIGS. 2 to 4 are flow charts of steps involved in three respective examples of the technique described with reference to FIG. 1.

Table 2 below presents a line-numbered code segment used to illustrate this first example. FIG. 2 is a flow chart of steps performed in this example, as described below.

The desired execution flow is that of jumping from the else statement at line 123 to the beginning of the if statement at line 132. The intermediate statements are skipped.

The reason for altering the execution flow in this way might be that the programmer wants to see the result of regressing to original code that existed before a code fix, which is a possible cause of an apparently unrelated side effect. In this case, the programmer may wish to test the result of program execution if certain steps are skipped. For example, the programmer wants to test the errors that are thrown if a certain programming library is not loaded properly. To simulate this situation, the programmer can skip the steps involved in loading the programming library.

TABLE 2

| | |
|---|---|
| 121 | number [0] = 0 ; |
| 122 | } |
| 123 | else |
| 124 | sign1 = 1; |
| 125 | |
| 126 | // Below is the fix that solves the crash problem |
| 127 | // . . . |
| 128 | // . . . |
| 129 | // For the sake of this example say the above fix is |
| 130 | // resulting in a side effect |
| 131 | |
| 132 | if (number2[0] = = '−') |
| 133 | { |
| 134 | sign2 = −1; |
| 135 | number2[0] = '0'; |
| 136 | } |

Step 210 When the program is started, the debugger determines the instruction in memory that maps to the "else" statement of line 123.

Step 220 This instruction is stored in the jump point and a break instruction (INT 3, for example) is inserted at that point.

Step 230 When execution control reaches the "else" statement, the break instruction is executed and the child program is suspended.

Step 240 The debugger determines if the break took place because of jump point. If so, the original instruction that was saved earlier is restored in the appropriate memory location. The program is single stepped.

Step 250 The break instruction is again reinserted at the "else" statement so that the next time the debugger can be informed that the jump point is reached.

Step 260 The instruction pointer register is then changed to the address of the instruction which is equivalent to the "if" statement of line 132, to effect the desired change of execution flow.

CASE EXAMPLE II

Figure 3:
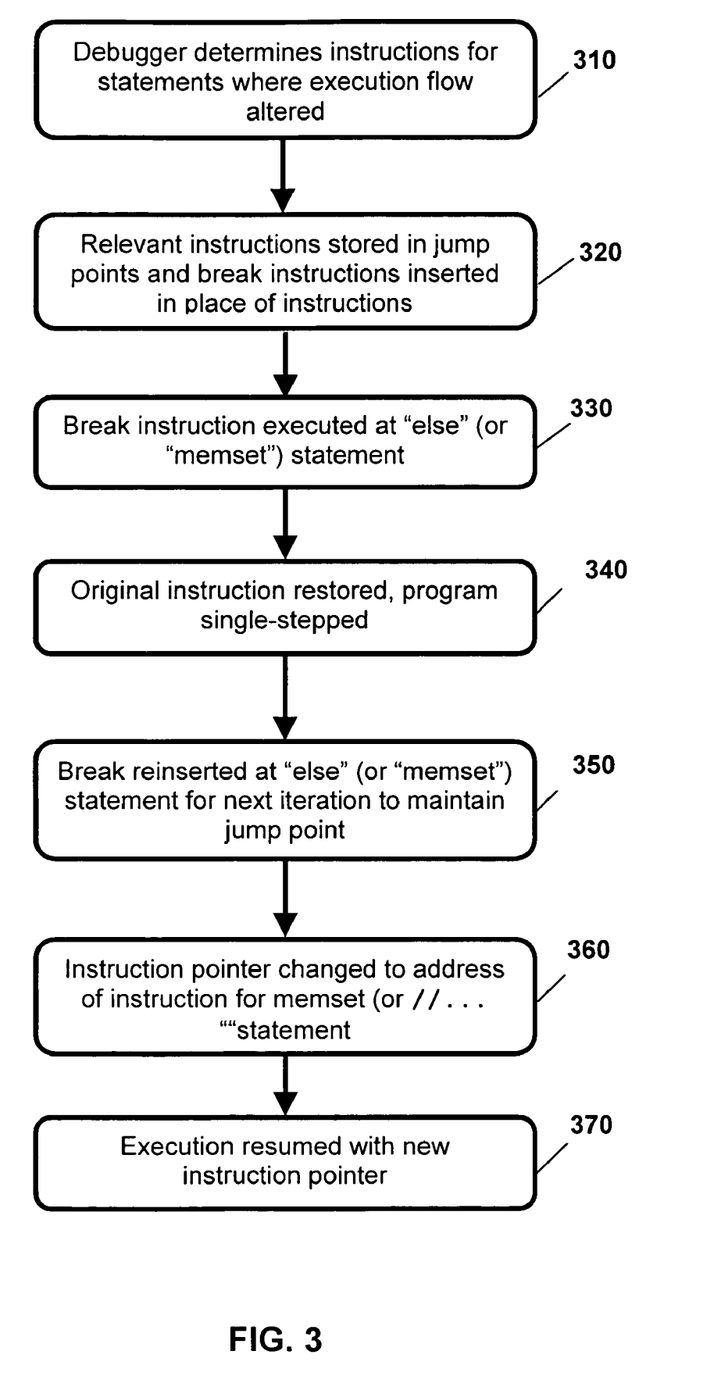

Table 3 below presents a line-numbered code segment used to illustrate this second example. FIG. 3 is a flow chart of steps performed in this example, as described below. A second example is presented in which the programmer wishes to alter the program flow in the sequence as follows. The desired execution flow is altered (i) from line 347 to line 358, then (ii) from line 358 to line 348, then (iii) from line 355 to line 360. Consequently, the memset instruction of line 358 is performed out of sequence.

TABLE 3

| | |
|---|---|
| 346 | else |
| 347 | sign =1 |
| 348 | |
| 349 | // Say below are statements that involve a bit of |
| 350 | // logic relevant to the program |
| 351 | // . . . |
| 352 | // . . . |
| 353 | // . . . |
| 354 | // . . . |
| 355 | // End of the code |
| 356 | |
| 357 | |
| 358 | memset(answer, '0' MAXPRODLEN-2) |
| 359 | answer [MAXPRODLEN-2] = '\0'; |
| 360 | bool flag = 1; |

Step 310 When the program is started, the debugger determines the instruction in memory that maps to the else, memset statements and the code denoted by the "// End of code".

Step 320 This instructions are stored in the jump points and a break instruction (for example, "INT 3") is inserted in place of each of the instructions.

Step 330 When the control reaches the "else" statement, the break instruction is executed and the child program is suspended.

Step 340 The debugger determines if the break took place because of jump point. If so, the original instruction that was saved earlier is restored in the memory location. The program is single stepped.

Step 350 The break instruction is again reinserted at the else statement so that the next time the debugger can be informed that the jump point is reached.

Step 360 The instruction pointer register is then changed to the address of the instruction which is equivalent to the memset statement and program execution is continued.

Step 370 The memset address actually contains another break instruction which throws an exception when executed. The procedure from step 340 is then repeated.

In recurring step 460, the break instruction is again inserted instead of the memset and the instruction pointer is changed to the code denoted by the first "// . . ." statement above. Once the code of lines 349 to 355 is executed, a break instruction is hit again and the original instruction is restored, the program single stepped and the break instruction inserted once again. The instruction pointer is then changed to the statement after the memset.

In this example, "memset" is assumed to correspond to one assembly instruction only. This is not true, but is an assumed faction adopted for the sake of explanation.

CASE EXAMPLE III

Figure 4:
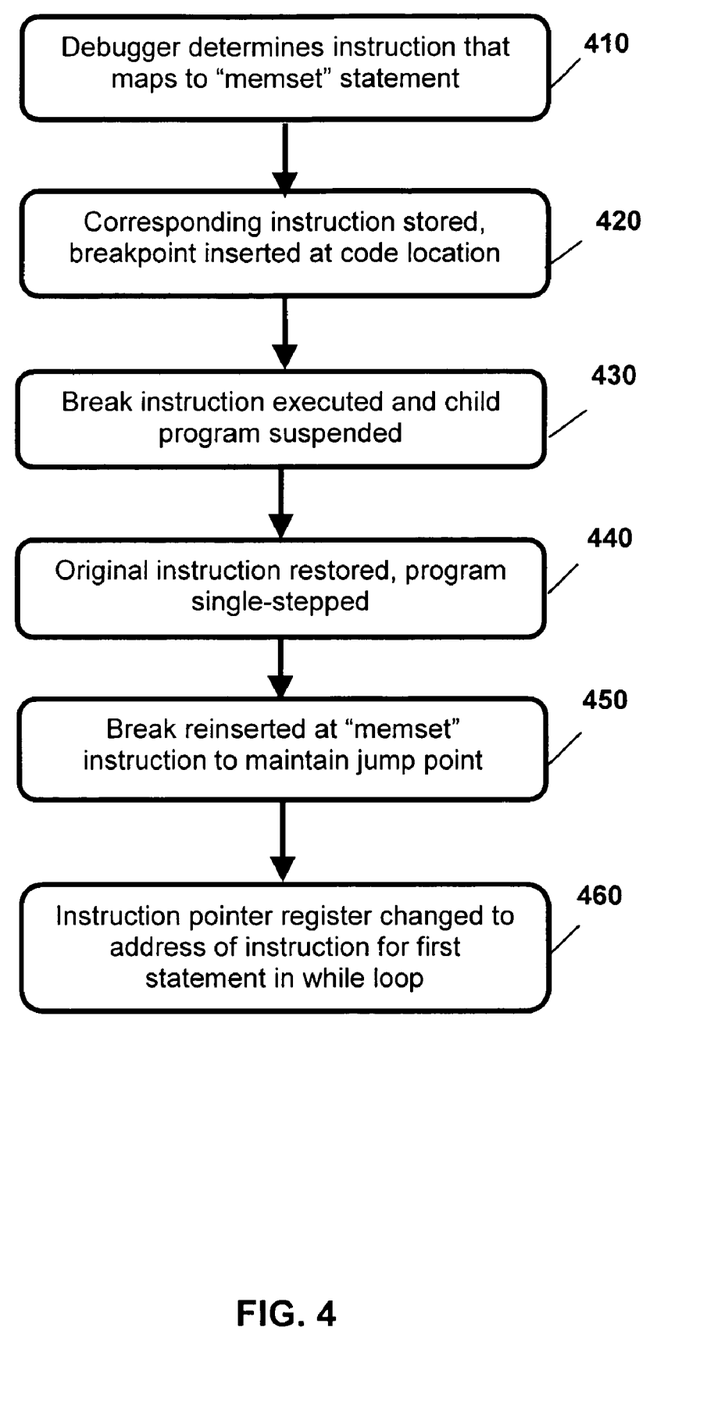

Table 4 below presents a code segment used to illustrate this third example. FIG. 4 is a flow chart of step performed in this example, as described below. This example involves converting a while-do loop to a do-while loop at runtime, which may be prompted by various reasons. The reasons for doing so may depend on the logic of the program under consideration. The desired execution flow in this code segment jumps from the memset statement on line 682 to line 685, skipping the intervening while statement.

TABLE 4

| | |
|---|---|
| 682 | memset (buf,0,2045); |
| 683 | while (/*condition*/ flag) |
| 684 | { |
| 685 | // . . . |
| 686 | // . . . |
| 687 | // . . . |
| 688 | // . . . |
| 689 | } |

Step 410 When the program is started, the debugger determines the instruction in memory that maps to the memset statement Step 420 This instruction is stored in the jump point and a break instruction (for example, INT 3) is inserted at that location.

Step 430 When the control reaches the memset statement, the break instruction is executed and the child program is suspended.

Step 440 The debugger determines if the break took place because of a jump point. If so, the original instruction that was saved earlier is restored in the memory location. The program is single stepped.

Step 450 The break instruction is again reinserted at the memset statement so that the next time the debugger can be informed that the jump point is reached.

Step 460 The instruction pointer register is then changed to the address of the instruction which is the first statement inside the while loop.

Thus, the while loop gets converted into a do-while loop without recompilation, and without any user intervention. The advantages of automatic alteration of flow execution are clear if the above snippet is executed a hundred thousand times in a short period of time—manual intervention is not required to perform this task in each instance.

Thin Debugger

Altering code flow as described above is helpful for eliminating bugs and observing the difference in execution. Programmers can use the methods in various ways in accordance with their needs. A further use of this technique is in creating "lightweight" or "thin" debuggers. These thin debuggers are stripped down versions of complete debuggers. The function of such a debugger is only to alter the flow of a program. That is, the debugger's user interface and the associated functionality are not present.

As with a regular debugger, the thin debugger executes a target program as its child program, and takes input that instructs the debugger how to alter the execution from the normal flow.

The main building blocks of such a thin debugger are listed as follows.

1. A main module that is capable of running a program as its child. This capability, as described earlier, allows the application to gain control over the child program.
2. A parsing unit that takes the input and parse the same to determine how the flow of code needs to be changed. This is the basic means of input. This unit is needed so that input can be provided in a text file or a binary file. Optionally, the input can also be a pointer to a server and further input can be sent over the network using a predefined protocol. The client server model of input allows one server to change flow of all thin weight applications connecting as clients. An important check to be performed by the parsing unit would be to make sure that the version of the executable is the same as that expected by the input.
3. A controlling unit that inserts break instructions; single steps the code and alters the instruction pointer to achieve the altered flow. These are the steps as described above.

The use of such an application can be to test applications at the client's site, for example, to produce hot fixes to undo harmful code that may be causing undesirable side effects.

Jump Points in an IDE

An Integrated Development Environment (IDE) is a development tool that integrates tools such as a compiler, linker, debugger and editor into one application. Usually an IDE uses external tools to perform the task of an edit-compile-debug cycle. These external tools are the compiler, linker, and debugger. The IDE provides a user interface for greater usability. IDEs can provide a shortcut key or a menu option to insert breakpoints. Also, IDEs can visually display breakpoints as specially marked areas in code. Internally, IDEs use the debugger to actually set the breakpoints.

Like breakpoints, jump points can be provided by IDEs through a user interface. The user provides the location of the jump and, the destination to where control is diverted as a result of the jump.

Consequently, the IDE can set the jump points in the debugger through the interface used to pass commands to the debugger. In summary, the IDE is a useful "wrapper" that presents the functionality of jump points in a manner similar to other features of the debugger.

Computer Hardware

Figure 5:
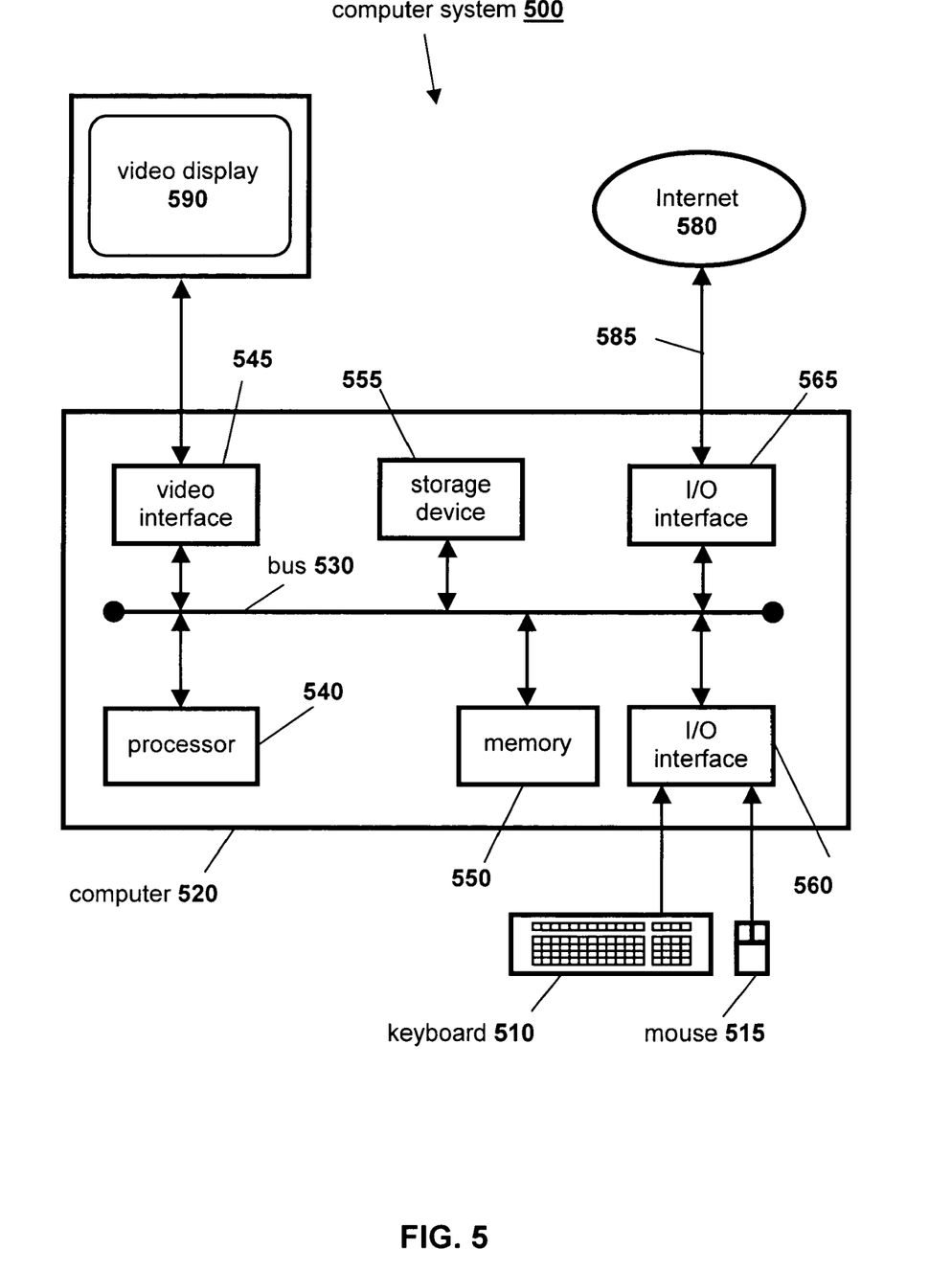
FIG. 5 is a schematic representation of a computer system suitable for performing the techniques described herein.

FIG. 5 is a schematic representation of a computer system 500 of a type suitable for executing a debugger or IDE incorporating the execution flow features described herein. The IDE executes under a suitable operating system installed on the computer system 500. This IDE is programmed using any suitable computer programming language, and may be thought of as comprising various software code means for achieving particular steps.

The components of the computer system 500 include a computer 520, a keyboard 510 and mouse 515, and a video display 590. The computer 520 includes a processor 540, a memory 550, input/output (I/O) interfaces 560, 565, a video interface 545, and a storage device 555.

The processor 540 is a central processing unit (CPU) that executes the operating system and the computer software executing under the operating system. The memory 550 includes random access memory (RAM) and read-only memory (ROM), and is used under direction of the processor 540.

The video interface 545 is connected to video display 590 and provides video signals for display on the video display 590. User input to operate the computer 520 is provided from the keyboard 510 and mouse 515. The storage device 555 can include a disk drive or any other suitable storage medium.

Each of the components of the computer 520 is connected to an internal bus 530 that includes data, address, and control buses, to allow components of the computer 520 to communicate with each other via the bus 530.

The computer system 500 can be connected to one or more other similar computers via a input/output (I/O) interface 565 using a communication channel 585 to a network, represented as the Internet 580.

The computer software may be recorded on a portable storage medium, in which case, the computer software program is accessed by the computer system 500 from the storage device 555. Alternatively, the computer software can be accessed directly from the Internet 580 by the computer 520. In either case, a user can interact with the computer system 500 using the keyboard 510 and mouse 515 to operate the programmed computer software executing on the computer 520.

Other configurations or types of computer systems can be equally well used to implement the described techniques. The computer system 500 described above is described only as an example of a particular type of system suitable for providing software tools.

Conclusion

The above examples illustrate the use of changing instruction pointers. The general techniques described are of use to programmers who use debuggers for developing computer programs, and especially when fixing bugs in a computer program.

Another context for the usefulness of the techniques described herein method is in relation to providing customer sites with a "quick fix" to a serious problem. For fatal bugs, the customer can be provided with an interim solution by altering the code flow. For such cases, the customer is neither able nor inclined to recompile the code to alter the execution flow of the software.

Yet a further context in which the described techniques are useful relates to cases in which a particular bug is not reproducible for a development team, but is reproducible for the customer. Programmers can alter the execution flow to see if the bug is fixed. If so, then a similar patch can be provided through a recompiled version of the program.

Various alterations and modifications can be made to the techniques and arrangements described herein, as would be apparent to one skilled in the relevant art.

I claim:

1. A method for automatically altering execution flow of a first computer program while the first program is executing, the method comprising the steps of:

executing the first program as a child of a second program, wherein instructions for the executing first program reside in respective memory locations of a computer and correspond to respective source code locations of the first program, and wherein the second program is operable for altering memory locations of the computer allocated to the child program, including memory designated for registers of the child program and memory designated for instructions of the child program;

receiving by the second program a desired flow of execution for the first program from a user predefined list, wherein the list includes a plurality of jump instructions, each jump instruction defining respective originating and destination source code locations in the first program; and inserting the plurality of jump instructions into memory locations of the computer corresponding to respective originating source code locations of the first program defined by the respective jump instructions, wherein for each of the plurality of inserted jump instructions, execution flow in the first program jumps from the memory location corresponding to the respective jump instruction's originating source code location to the memory location corresponding to the respective jump instruction's defined destination source code location responsive to the first program encountering the memory location corresponding to the respective jump instruction's originating source code location, wherein the inserting is performed automatically by the second program responsive to the user predefined list.

2. The method as claimed in claim 1, wherein each jump instruction also defines a location for temporary storage of one or more instructions corresponding to the respective jump instruction's originating source code location of the first program, the method further comprising the step of temporarily storing, for each of the plurality of inserted jump instructions, an original instruction of the first program corresponding to the respective jump instruction's originating source code location.

3. The method as claimed in claim 2, further comprising the step of restoring the temporarily stored original instruction at the origin address after the step of inserting.

4. The method as claimed in claim 1, wherein for each of the plurality of inserted jump instructions, the method further comprises the step of adding the memory location corresponding to the respective jump instruction's originating source code location to a debugging register.

5. The method as claimed in claim 4, wherein for each of the plurality of inserted jump instructions, the method further comprises the step of removing the memory location corresponding to the respective jump instruction's originating source code location from a debugging register.

6. The method as claimed in claim 1, wherein for each of the plurality of inserted jump instructions, the method further comprises the step of clearing the jump instruction from the computer program.

7. The method as claimed in claim 1, further comprising the step of loading the first computer program as a child process of the second program.

* * * * *